(12) United States Patent
Namer et al.

(10) Patent No.: US 12,470,546 B2
(45) Date of Patent: Nov. 11, 2025

(54) ENHANCED INFRASTRUCTURE AS CODE SECURITY

(71) Applicant: Google LLC, Mountain View, CA (US)

(72) Inventors: Assaf Namer, Sunnyvale, CA (US); Brandon Maltzman, Deerfield, IL (US); Olanrewaju Ogunmola, Manassas, VA (US)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 18/419,921

(22) Filed: Jan. 23, 2024

(65) Prior Publication Data

US 2025/0240284 A1 Jul. 24, 2025

(51) Int. Cl.
*H04L 9/40* (2022.01)
*H04L 67/02* (2022.01)

(52) U.S. Cl.
CPC ............ *H04L 63/083* (2013.01); *H04L 67/02* (2013.01)

(58) Field of Classification Search
CPC ............................... H04L 63/083; H04L 67/02
See application file for complete search history.

(56) References Cited

U.S. PATENT DOCUMENTS

| | | | | |
|---|---|---|---|---|
| 7,363,361 B2 * | 4/2008 | Tewari | ................ | H04L 63/0428 709/223 |
| 8,214,884 B2 * | 7/2012 | Xia | ..................... | H04L 63/0281 713/153 |
| 8,452,882 B2 * | 5/2013 | Schneider | ............... | H04L 63/10 726/20 |
| 8,560,820 B2 * | 10/2013 | de Cesare | .......... | H04N 21/4432 713/168 |
| 8,838,961 B2 * | 9/2014 | Zarfoss, III | ........... | H04L 63/083 726/5 |

(Continued)

OTHER PUBLICATIONS

Espinha Gasiba, Tiago, et al. "Raising security awareness of cloud deployments using infrastructure as code through cybersecurity challenges." Proceedings of the 16th international conference on availability, reliability and security. 2021.*

(Continued)

*Primary Examiner* — Jimmy H Tran
(74) *Attorney, Agent, or Firm* — Lowenstein Sandler LLP

(57) ABSTRACT

A method includes receiving, at a server, an authorizing request pertaining to authorization of future modification to a plurality of computing resources of a computing resource environment, the authorizing request comprising first credentials and an authorization value that is based on a first computing resource environment configuration file and a second computing resource environment configuration file. The method includes, responsive to a validation of the first credentials, storing the authorization value in a datastore. The method includes, receiving, at the server, a modification request comprising second credentials and comparing the modification request to the stored authorization value. The method further includes, responsive to the modification request matching the stored authorization value and a validation of the second credentials, modifying the plurality of computing resources of the computing resource environment based on the first computing resource environment configuration file and the second computing resource environment configuration file.

20 Claims, 5 Drawing Sheets

(56) References Cited

U.S. PATENT DOCUMENTS

| | | | |
|---|---|---|---|
| 9,584,516 B2* | 2/2017 | Cai | H04L 63/10 |
| 10,382,427 B2* | 8/2019 | Lambiase | H04L 63/0823 |
| 11,068,567 B2* | 7/2021 | Ramalingam | H04L 9/0891 |
| 11,216,265 B1* | 1/2022 | Hornbeck | G06F 9/5072 |
| 11,368,462 B2* | 6/2022 | North | H04L 63/101 |
| 11,372,626 B2* | 6/2022 | White, III | G06F 8/60 |
| 11,429,353 B1* | 8/2022 | Liguori | G06F 8/311 |
| 11,513,864 B2* | 11/2022 | Koppes | G06F 9/5072 |
| 11,550,568 B1* | 1/2023 | Wall | G06F 8/71 |
| 11,811,768 B2* | 11/2023 | Petersen | G06F 16/9566 |
| 11,863,562 B1* | 1/2024 | Mesard | H04L 63/102 |
| 12,105,683 B2* | 10/2024 | Madan | G06F 16/212 |
| 12,174,856 B2* | 12/2024 | Mehta | G06F 16/24553 |
| 12,292,982 B2* | 5/2025 | Plotnik | G06F 21/577 |
| 12,306,819 B2* | 5/2025 | Pandey | G06F 16/252 |
| 2011/0314532 A1* | 12/2011 | Austin | H04L 63/0892 726/8 |
| 2013/0205133 A1* | 8/2013 | Hess | H04L 63/0884 713/155 |
| 2014/0082350 A1* | 3/2014 | Zarfoss, III | H04L 63/083 713/155 |
| 2014/0282919 A1* | 9/2014 | Mason | H04L 67/02 726/4 |
| 2015/0007274 A1* | 1/2015 | Chang | G06F 21/6218 726/4 |
| 2015/0220718 A1* | 8/2015 | Hong | H04L 63/18 726/9 |
| 2016/0011894 A1* | 1/2016 | Reddy | H04L 12/4675 718/1 |
| 2017/0048215 A1* | 2/2017 | Straub | H04L 63/0823 |
| 2017/0099148 A1* | 4/2017 | Ochmanski | H04L 67/125 |
| 2019/0294477 A1* | 9/2019 | Koppes | G06F 9/5072 |
| 2021/0055917 A1* | 2/2021 | Khakare | G06F 9/45558 |
| 2021/0055927 A1* | 2/2021 | Sarukkai | G06F 8/71 |
| 2021/0234925 A1* | 7/2021 | Cook | H04L 67/02 |
| 2021/0326239 A1* | 10/2021 | Vaughan | G06F 8/77 |
| 2022/0103518 A1* | 3/2022 | LaChance | H04L 63/0435 |
| 2022/0114023 A1* | 4/2022 | Choksi | G06F 9/4411 |
| 2023/0132503 A1* | 5/2023 | Plotnik | G06F 21/577 726/25 |
| 2023/0132560 A1* | 5/2023 | Bunciak | G06F 8/60 717/170 |
| 2023/0254330 A1* | 8/2023 | Singh | G06F 11/323 726/23 |
| 2024/0037227 A1* | 2/2024 | Deutscher | G06F 21/554 |
| 2024/0305583 A1* | 9/2024 | Naylor | H04L 41/082 |
| 2024/0354293 A1* | 10/2024 | Liburdi | G06F 16/217 |
| 2025/0016138 A1* | 1/2025 | Greene | H04L 63/0281 |
| 2025/0023771 A1* | 1/2025 | Chauhan | H04L 41/0843 |
| 2025/0030722 A1* | 1/2025 | Ragula | H04L 63/102 |
| 2025/0047702 A1* | 2/2025 | Formicola | H04L 63/1433 |
| 2025/0111286 A1* | 4/2025 | Ghosh | G06N 20/00 |
| 2025/0168219 A1* | 5/2025 | Li | H04L 67/10 |
| 2025/0193020 A1* | 6/2025 | Patnala | H04L 63/0263 |
| 2025/0193151 A1* | 6/2025 | Kumar | G06F 12/0802 |
| 2025/0193152 A1* | 6/2025 | Madabhushi | H04L 41/16 |
| 2025/0193155 A1* | 6/2025 | Narayanaswamy | H04L 63/0236 |
| 2025/0193231 A1* | 6/2025 | Chander | H04L 63/1416 |
| 2025/0193249 A1* | 6/2025 | Patnala | H04L 63/145 |
| 2025/0193250 A1* | 6/2025 | Patnala | H04L 63/0236 |
| 2025/0193561 A1* | 6/2025 | Kumar | H04L 63/0236 |

OTHER PUBLICATIONS

Sokolowski, Daniel. "Infrastructure as code for dynamic deployments." Proceedings of the 30th ACM Joint European Software Engineering Conference and Symposium on the Foundations of Software Engineering. 2022.*

Verdet, Alexandre. Exploring security practices in infrastructure as code: An empirical study. MS thesis. Ecole Polytechnique, Montreal (Canada), 2023.*

Rahman, Akond, Rezvan Mahdavi-Hezaveh, and Laurie Williams. "A systematic mapping study of infrastructure as code research." Information and Software Technology 108 (2019): 65-77.*

"API HMAC Authentication," Oracle, 2022, downloaded Nov. 10, 2023, 5 pages. https://docs.oracle.com/en/cloud/saas/marketing/crowdtwist-develop/Developers/HMACAuthentication.html.

Li et al., et al., "Discovery Security Sample—WCF / Microsoft Learn," Microsoft Ignite, Sep. 15, 2021, 4 pages. https://learn.microsoft.com/en-us/dotnet/framework/wcf/samples/discovery-security-sample.

Woodring, "How to Secure Webhook Endpoints with HMAC," Prismatic, May 15, 2023, 11 pages. https://prismatic.io/blog/how-securewebhook-endpoints-hmac/.

Copparapu, "Digital signing with the new asymmetric keys feature of AWS KMS," AWS Security Blog, Amazon, Nov. 25, 2019, 7 pages. https://aws.amazon.com/blogs/security/digital-signing-asymmetric-keys-aws-kms/.

* cited by examiner

ENHANCED INFRASTRUCTURE AS CODE SECURITY

TECHNICAL FIELD

Aspects and implementations of the present disclosure relate to computer security, and, in particular, to security related to cloud environments using infrastructure as code.

BACKGROUND

Infrastructure as Code (IaC) treats infrastructure configurations as code artifacts. IaC enables the automated provisioning and management of infrastructure (e.g., computing resources, virtual machines, databases, etc.) through the use of declarative or imperative code. Declarative IaC uses configuration files to describe the desired state of the infrastructure and can allow for monitoring and managing of configuration drift. Imperative IaC utilizes scripts to define specific actions for provisioning and configuring resources. IaC is often used to manage remote computing resources in a cloud environment.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for enhanced infrastructure as code security. In an implementation, a method includes receiving, at a server, an authorizing request pertaining to authorization of future modifications to a plurality of computing resources of a computing resource environment. The authorizing request includes first credentials and an authorization value that is based on a first computing resource environment configuration file and a second computing resource environment configuration file. The method further includes, responsive to a validation of the first credentials, storing the authorization value in a datastore. The method further includes receiving, at the server, a modification request comprising second credentials. The method further includes comparing the modification request to the stored authorization value. The method further includes, responsive to the modification request matching the stored authorization value and a validation of the second credentials, modifying the plurality of computing resources of the computing resource environment based on the first computing resource environment configuration file and the second computing resource environment configuration file.

In some embodiments, the first computing resource environment configuration file has been modified subject to validation of third credentials, the second computing resource environment configuration file has been modified subject to validation of fourth credentials, and the third credentials and the fourth credentials are different.

In some embodiments, the authorization value is generated by generating one or more hypertext transfer protocol (HTTP) requests based on the first computing resource environment configuration file and the second computing resource environment configuration file. The authorization value is generated further by encrypting the one or more HTTP requests. In some embodiments, generating one or more HTTP requests is performed by a source control and the encrypting is performed by a key management system (KMS). In some embodiments, the modification request further includes one or more encrypted hypertext transfer protocol (HTTP) requests received from the source control.

In some embodiments, the authorization value is generated by generating one or more HTTP requests based on the first computing resource environment configuration file and the second computing resource environment configuration file. The authorization value is generated further by calculating a first hash based on the one or more HTTP requests. The authorization value is generated further by encrypting the first hash.

In some embodiments, comparing the modification request to the stored authorization value includes retrieving the stored authorization value from the datastore. Comparing the modification request to the stored authorization value further includes decrypting the stored authorization value to obtain a decrypted hash. Comparing the modification request to the stored authorization value further includes calculating a second hash based on at least a portion of the modification request. Comparing the modification request to the stored authorization value further includes comparing the decrypted hash to the second hash.

In some embodiments a computer-readable storage medium (which may be non-transitory computer-readable storage medium, although the invention is not limited to that) stores instructions which, when executed, cause a processing device to perform operations comprising a method according to any embodiment or aspect described herein.

In some embodiments a system comprises: a memory device; and a processing device operatively coupled with the memory to perform operations comprising a method according to any embodiment or aspect described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
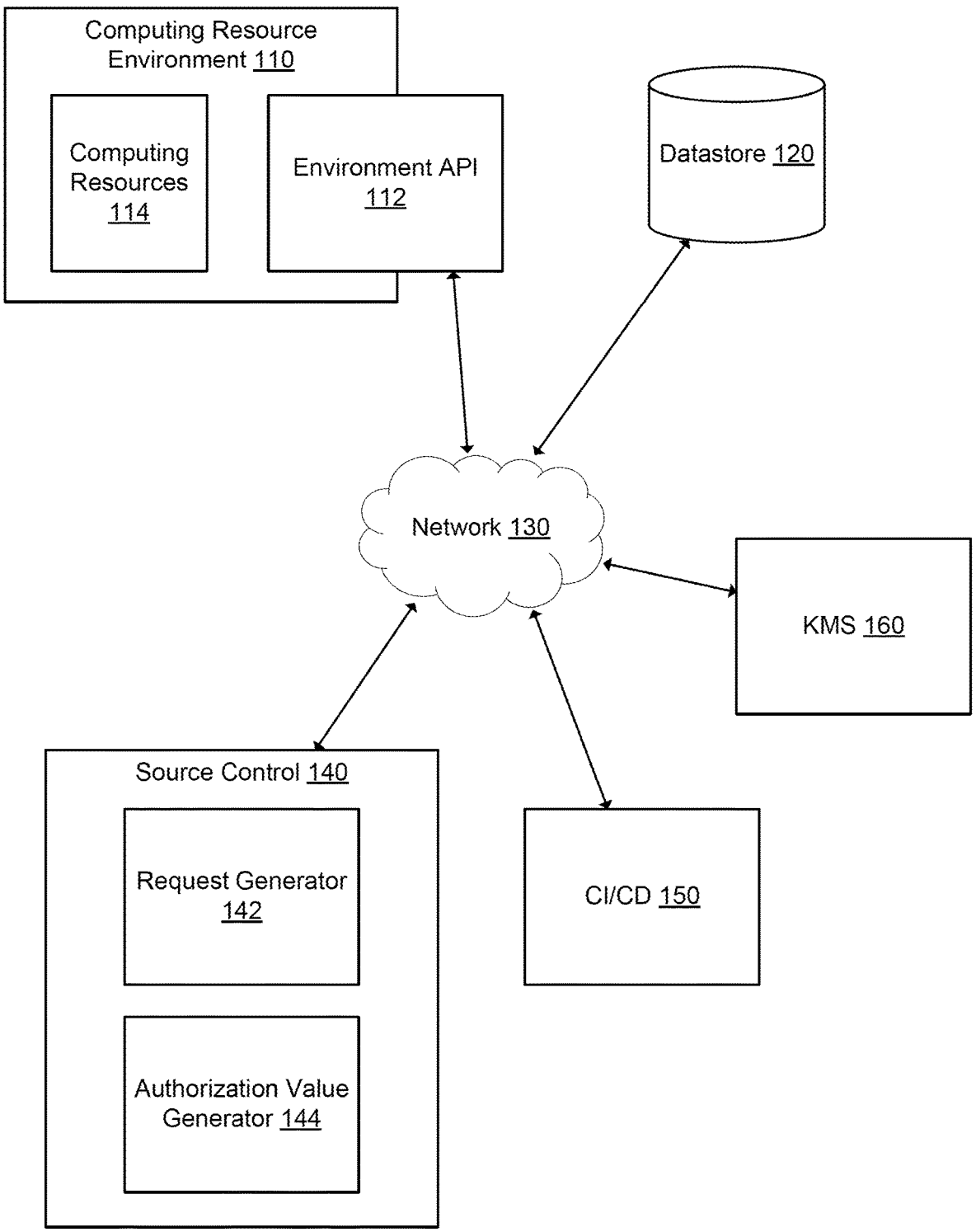
FIG. 1 illustrates an example system for enhanced infrastructure as code security, in accordance with at least one embodiment.

Infrastructure as Code (IaC) enables the automated provisioning and management of infrastructure (e.g., computing resources, virtual machines, databases, etc.) through the use of declarative or imperative code. IaC treats infrastructure configurations as code artifacts. Declarative IaC uses configuration files to describe the desired state of the infrastructure, while imperative IaC utilizes scripts to define specific actions for provisioning and configuring resources. IaC configuration files may be stored in a source control (e.g., file version control system). One or more users (e.g., developers) may contribute code to the source control to modify the IaC configuration files. Cloud resources may be managed (e.g., provisioned, deployed, decommissioned, (re) configured, etc.) by executing the IaC configuration files. In some cases, execution of the IaC configuration files is performed by a system separate from the source control (e.g., a continuous integration, continuous delivery (CI/CD) system or pipeline). Often, different credentials are used to authorize code changes in the source control and to execute the IaC configuration files and modify the cloud environment.

In traditional systems, if a malicious actor gets access to the credentials used to execute the IaC configuration files, the malicious actor can make unauthorized modifications to the cloud environment by executing modified IaC configuration files. For example, a malicious actor may gain access to the credentials of a CI/CD system. The CI/CD system may be able to pull the latest versions of the IaC configuration files from the source control. Typically, the CI/CD system would immediately execute the IaC configuration files and modify the cloud environment. However, a malicious actor may pull some IaC configuration files (e.g., the latest version) from the source control and modify the IaC configuration files (e.g., without adding the modifications to source control) before executing the modified IaC configuration files and modifying the cloud environment in an unauthorized manner. The cloud environment (e.g., a cloud application programmer interface (API) or cloud API endpoint) may not be able to detect that the IaC configuration files were modified and may modify the cloud environment simply because the CI/CD system credentials were used to execute the (modified) IaC configuration files, potentially allowing unauthorized access to cloud computing resources and making the cloud environment susceptible to phishing attacks or other malicious activity.

Aspects of the present disclosure address the above and other deficiencies by providing defense-in-depth to protect a computing resource environment (e.g., cloud environment, data center environment, etc.) that utilizes infrastructure as code (IaC). To provide enhanced IaC security, a system implementing the techniques disclosed herein may use a plurality of identity and access management (IAM) permissions to ensure that only authorized modifications are made to computing resource environments. Access to IaC configuration files may be protected by a first set of IAM permissions and execution of IaC configuration files may be protected by another set of IAM permissions. In some embodiments, IaC configuration files are protected by multiple sets of IAM permissions. For example, a first IaC configuration file may have one or more variable placeholders that can be assigned based on another configuration file. Modifications to the first IaC configuration file (e.g., in a source control) may require a first set of credentials to satisfy the IAM permissions. Modifications to a second IaC configuration file (e.g., in a source control) that has variable values which replace the variable placeholders of the first IaC configuration file may require a second set of credentials.

After IaC configuration files have been committed to a source control, the source control may generate an authorization value and provide that authorization value to a computing resource environment API (e.g., a cloud API endpoint) using a third set of credentials. The cloud endpoint may store the authorization value in a datastore. Upon receiving future modification requests (e.g., from a CI/CD system), the cloud endpoint may compare the received modification request to the authorization value. If the received modification request (or a portion thereof) matches the authorization value, and if the received modification request includes a fourth set of credentials (e.g., OAuth 2.0 credentials, OpenID Connect (OIDC) credentials, etc.), the received modification request may be executed by the computing resource endpoint to modify the computing resource environment (e.g., to modify computing resources of the cloud environment). Thus, a malicious actor cannot make an unauthorized modification to a cloud environment only using one set of compromised credentials (e.g., using only CI/CD system credentials) because the modification will not have been previously authorized (e.g., from the source control) using other credentials.

As an example, a configuration file (e.g., Terraform script) may include code to change a computing environment storage permissions. When the CI/CD system executes the Terraform script, each API request to the environment API may include an authorization value (e.g., an encrypted hash, an encrypted HTTP request) which can only be validated by a private key. Because the environment API has access to the private key (e.g., via a key management system), the environment API can ensure the API request came from an appropriate source and has not been altered on the way. Even if the CI/CD system has been compromised, the CI/CD system has no access to the private key used to generate the authorization value, so the CI/CD system cannot arbitrarily cause changes to be made to the computing resource environment.

Advantages of the disclosed embodiments over the existing technology include but are not limited to ensuring that IaC code that is being executed (e.g., from a CI/CD system) to modify a computing resource environment has been authorized, preventing rogue (e.g., unauthorized, malicious) configurations from being applied. If the service account that deploys the IaC (e.g., CI/CD system) is compromised, the account will not have the ability to execute arbitrary IaC configuration files because the arbitrary IaC configuration files will not have been previously authorized (e.g., no authorization value corresponding to the arbitrary IaC configuration files was previously provided to the environment API). Prior to this invention, a rogue service account could perform nefarious activity (e.g., make unauthorized modifications to computing resource environments) as there was no authorization of IaC configuration files. As a result of the disclosed embodiments, additional and increased security is provided to computing resource environments such as those of cloud and data center environments. As a consequence, aspects of the present disclosure reduce wasted computing resources that would need to be otherwise consumed to detect and address unauthorized access to computing resources and associated malicious activity.

FIG. 1 illustrates an example system 100 for enhanced infrastructure as code security, in accordance with at least one embodiment. System 100 may include computing resource environment (e.g., cloud environment or data center environment) 110, datastore 120, network 130, source control 140, CI/CD 150, and key management system (KMS) 160. Computing resource environment 110 may include environment API 112 and computing resources 114. Environment API 112 may expose one or more endpoints to permit modification of computing resources 114 of computing resource environment 110. Computing resources 114 may include one or more servers, virtual machines, containerized applications, databases, networks, or the like. In some embodiments, computing resources 114 of computing resource environment 110 are managed by IaC configuration files. For example, executing an IaC configuration file may generate one or more hypertext transfer protocol (HTTP) requests that may be sent to environment API 112 (e.g., to an endpoint of environment API 112). The one or more HTTP requests may include configuration data related to the desired state of computing resource environment 110. The configuration data may include machine identifiers, operating system identifiers, resource allocations and/or limits, network configurations, and the like. In some embodiments, one or more entities may use computing resource environment 110. For example, computing resources 114 may include an entity identifier and may be grouped by entity. Requests sent to environment API 112 may include an entity identifier, and environment API 112 may only modify computing resources 114 associated with the identified entity in response to the received request. In some embodiments, requests sent to environment API 112 may only be executed if the requests include credentials authorized to make modifications to computing resources 114.

Datastore 120 may be a persistent storage that is capable of storing authorization values, credentials, computing resource environment configuration files, configuration data, and the like. Datastore 120 may be hosted by one or more storage devices, such as main memory, magnetic or optical storage-based disks, tapes or hard drives, network attached storage (NAS), storage area network (SAN), and so forth. In some embodiments, datastore 120 may be a network-attached file server. In some embodiments, datastore 120 may be some other type of persistent storage such as an object-oriented database, a relational database, and so forth. In some embodiments, datastore 120 may be hosted on or may be a component of computing resource environment 110. In some embodiments, datastore 120 may be provided by a third-party service such as a computing resource platform provider.

Computing resource environment 110, datastore 120, source control 140, CI/CD 150, and KMS 160 may be connected to network 130, such as a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Source control 140 may be a file version control system (e.g., Git, SVN, Mercurial, etc.). In some embodiments, source control 140 is hosted by a local server (e.g., on premises). In some embodiments, source control 140 is hosted by a remote server (e.g., in the cloud, by a third party, etc.). Source control 140 may include one or more IaC configuration files and may track revisions to the one or more IaC configuration files. Authorized credentials may be required to modify an IaC configuration file. Modification of different IaC configuration files may require different credentials. For example, a first IaC configuration file may include one or more variable placeholders. To modify the first IaC configuration file, a first set of credentials may be required. A second IaC configuration file may have one or more variable values that correspond to and replace the variable placeholders of the first IaC configuration file. To modify the second IaC configuration file, a second set of credentials may be required. In some embodiments, the first set of credentials and the second set of credentials are different.

Source control 140 may include request generator 142 and authorization value generator 144. Request generator 142 may generate one or more HTTP requests based on a set of IaC configuration files (e.g., the first IaC configuration file and the second configuration file). The one or more HTTP requests may be formatted such that they would be accepted by environment API 112 and may include configuration data to modify computing resources 114 of computing resource environment 110. Request generator 142 may generate the one or more HTTP requests without sending the requests to another device (e.g., the HTTP requests may be generated and may not be sent to environment API 112).

Authorization value generator 144 may generate an authorization value based on the generated one or more HTTP requests (which, in turn, are based on one or more IaC configuration files). In some embodiments, authorization value generator 144 may generate an authorization value by providing the one or more HTTP requests to KMS 160 to obtain an encrypted HTTP request. KMS 160 may encrypt the one or more HTTP requests using a cryptographic key (e.g., an asymmetric key, a symmetric key). In some embodiments, the encrypted HTTP request includes an identifier of the cryptographic key. In some embodiments, the encrypted HTTP request may be stored by source control 140 and may later be provided to CI/CD 150. In some embodiments, authorization value generator 144 may generate an authorization value by generating a hash of the one or more HTTP requests. Authorization value generator 144 may provide the hash of the one or more HTTP requests to KMS 160 to obtain an encrypted hash. KMS 160 may encrypt the hash using a cryptographic key. In some embodiments, the encrypted hash includes an identifier of the cryptographic key. In some embodiments, authorization value generator 144 may generate an authorization value by generating a hash of the one or more HTTP requests and may not provide the hash to KMS 160 for encryption.

After generating the authorization value, source control 140 may provide the authorization value to computing resource environment 110. For example, source control 140 may send an HTTP request (e.g., an authorizing request) that includes the authorization value to environment API 112. The authorizing request may also include credentials that authorize the authorization value to be stored by environment API 112 (e.g., in datastore 120). The authorization value may pertain to authorization of future modifications to computing resources 114 of computing resource environment 110. For example, if future modification requests received by environment API 112 do not match a stored authorization value (e.g., an authorization value stored in datastore 120), the modification request may be rejected and computing resource environment 110 may not be modified.

CI/CD 150 may be a system for continuous integration and continuous delivery. CI/CD 150 may access source code (including IaC configuration files) stored at source control 140 and may deploy updates as source code is changed. CI/CD 150 may deploy updates when code changes in source control 140, according to a schedule (e.g., hourly, daily, weekly, etc.), and/or on demand. For example, CI/CD 150 may execute IaC configuration file(s) to modify a computing resource environment (e.g., computing resource environment 110) after one or more IaC configuration files have been committed to source control 140. Executing the IaC configuration file(s) may include generating one or more HTTP requests based on the IaC configuration file(s) and sending the one or more HTTP requests to an environment API endpoint (e.g., an endpoint of environment API 112). In some embodiments, credentials are included with the one or more HTTP requests to authorize modification of the computing resources of the computing resource environment. In some embodiments, the credentials included with the one or more HTTP requests are associated only with CI/CD 150.

In some embodiments, instead of generating one or more HTTP requests based on IaC configuration files, CI/CD 150 may request an encrypted HTTP request from source control 140. The encrypted HTTP request may be based on the IaC configuration files and may have been generated previously by source control 140. CI/CD 150 may provide the encrypted HTTP request and credentials to environment API 112 as a modification request to modify computing resources 114 of computing resource environment 110 according to the IaC configuration files.

KMS 160 may be a key management system and may encrypt and/or decrypt data. KMS 160 may use asymmetric cryptography, symmetric cryptography, and/or a combination thereof. In some embodiments, KMS 160 is connected to source control 140 and computing resource environment 110 (e.g., via network 130) but is not connected to CI/CD 150. In some embodiments, KMS 160 encrypts data provided by source control 140 (e.g., authorization values) and decrypts data provided by computing resource environment 110 (e.g., stored authorization values). In some embodiments, KMS 160 is hosted by a local server (e.g., on premises). In some embodiments, KMS 160 is hosted by a remote server (e.g., in the cloud, by a third party, etc.).

Figure 4:
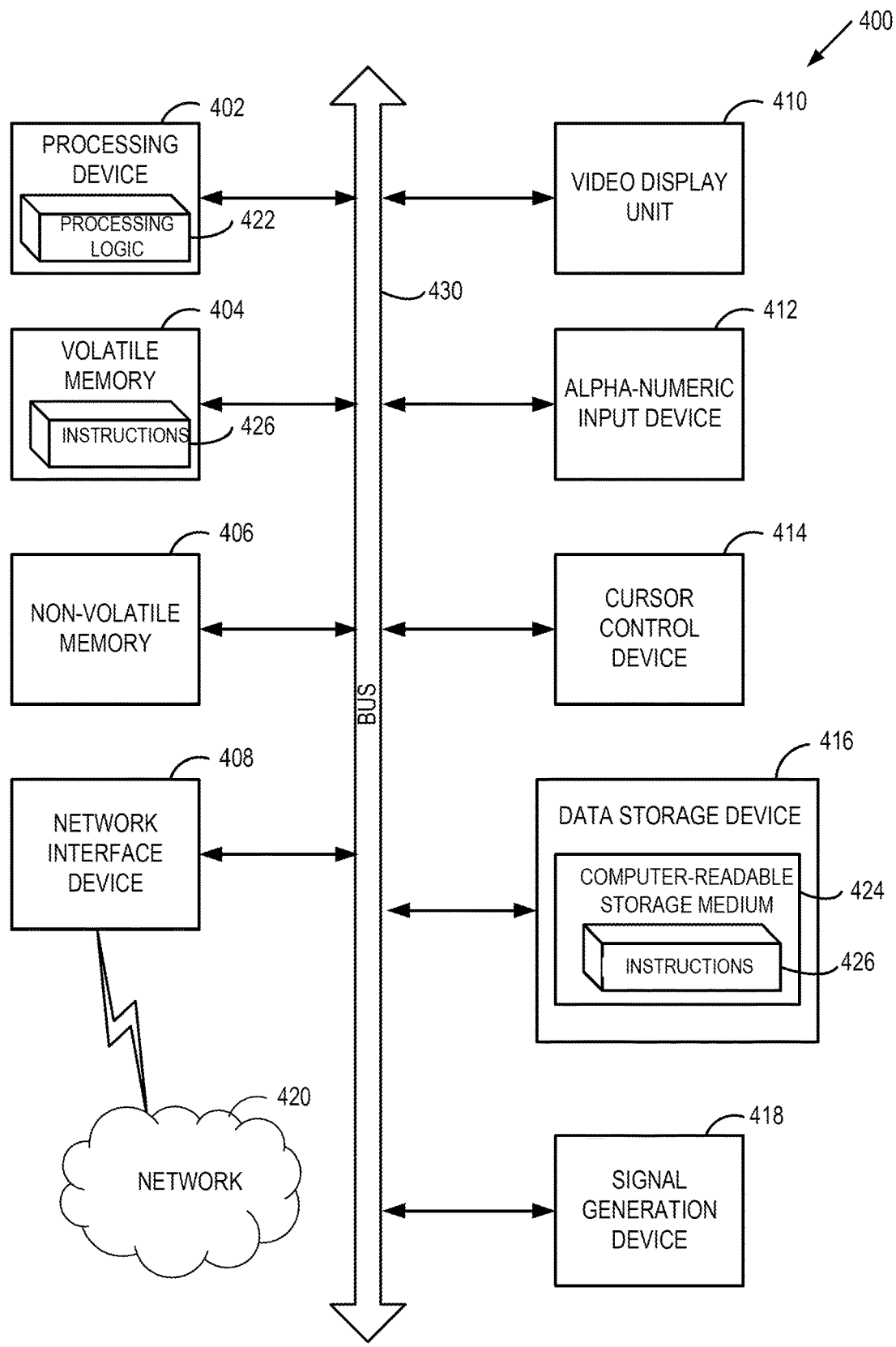
FIG. 4 is a block diagram illustrating an exemplary computer system, in accordance with at least one embodiment of the present disclosure.

Computing resource environment 110, computing resources 114, source control 140, CI/CD 150, and/or KMS 160 may include one or more processing devices, volatile and non-volatile memory, data storage, one or more input/output peripherals such as network interfaces. FIG. 4 illustrates an example architecture of computing resource environment 110, computing resources 114, source control 140, CI/CD 150, and/or KMS 160. In some embodiments, computing resource environment 110, computing resources 114, source control 140, CI/CD 150, and/or KMS 160 may be singular devices such as smartphones, tablets, laptops, desktops, workstations, edge devices, embedded devices, servers, network appliances, security appliances, etc. In some embodiments, computing resource environment 110, computing resources 114, source control 140, CI/CD 150, and/or KMS 160 may comprise multiple devices of similar or varying architecture such as computing clusters, data centers, co-located servers, enterprise networks, geographically disparate devices connected via virtual private networks (VPNs), etc. In some embodiments, computing resource environment 110, computing resources 114, source control 140, CI/CD 150, and/or KMS 160 may comprise hardware devices such as those just described, virtual resources such as virtual machines (VMs) and containerized applications, or a combination of hardware and virtual resources. In some embodiments, computing resource environment 110, computing resources 114, source control 140, CI/CD 150, and/or KMS 160 may be associated with one or more entities. For example, an entity may own or lease hardware devices such as a server or a data center. In another example, a client entity may lease virtual resources (e.g., a VM) from a provider entity. The provider entity may provision the virtual resources (along with virtual resources associated with other client entities) on hardware devices the provider entity owns or leases itself. In some embodiments, datastore 120 and/or KMS 160 are included as part of computing resource environment 110. In some embodiments, KMS 160 may be included as part of source control 140.

In some embodiments, a system architecture may differ from the example system architectures described above and may include more or fewer components than those described with respect to the example system architectures. Other system architectures are within the spirit and scope of the disclosure. Furthermore, "cloud" and "cloud environment" as referenced herein are provided as examples only and should be interpreted to cover any other environments that include computing resources (e.g., data center environments or any other environments including a collection of computing resources).

In implementations of the disclosure, a "user" can be represented as a single individual. However, other implementations of the disclosure encompass a "user" being an entity controlled by a set of users or an organization and/or an automated source such as a system or a platform. In situations in which the systems discussed here collect personal information about users, or can make use of personal information, the users can be provided with an opportunity to control whether system 100 collects user information (e.g., information about a user's social actions or activities, profession, a user's preferences, or a user's current location), or to control whether and/or how to receive content from the system 100 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the system 100.

Figure 2A:
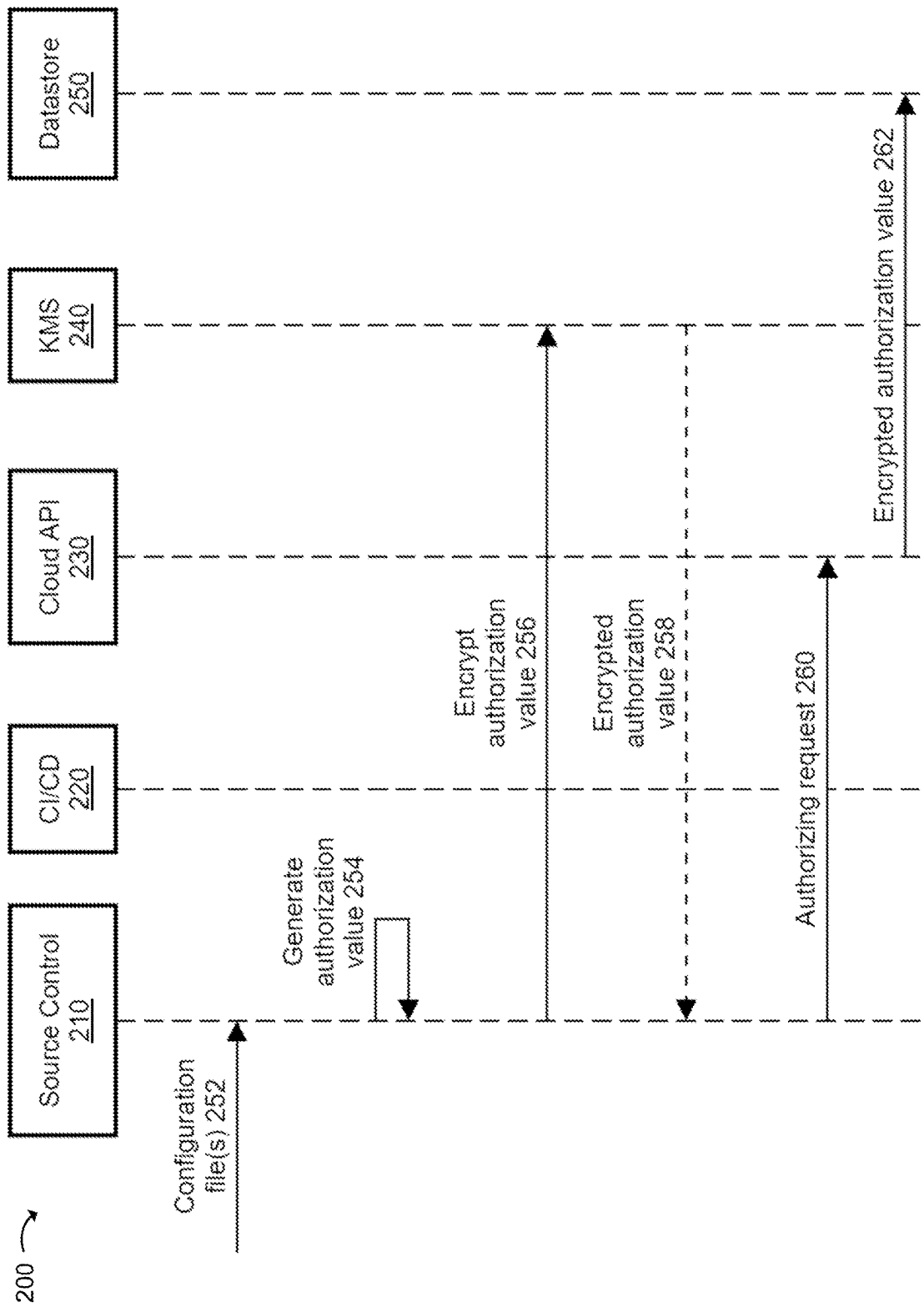
FIGS. 2A-B depict example sequence diagrams illustrating authorizing cloud environment modifications and modifying cloud environments, in accordance with at least one embodiment.
Figure 2B:
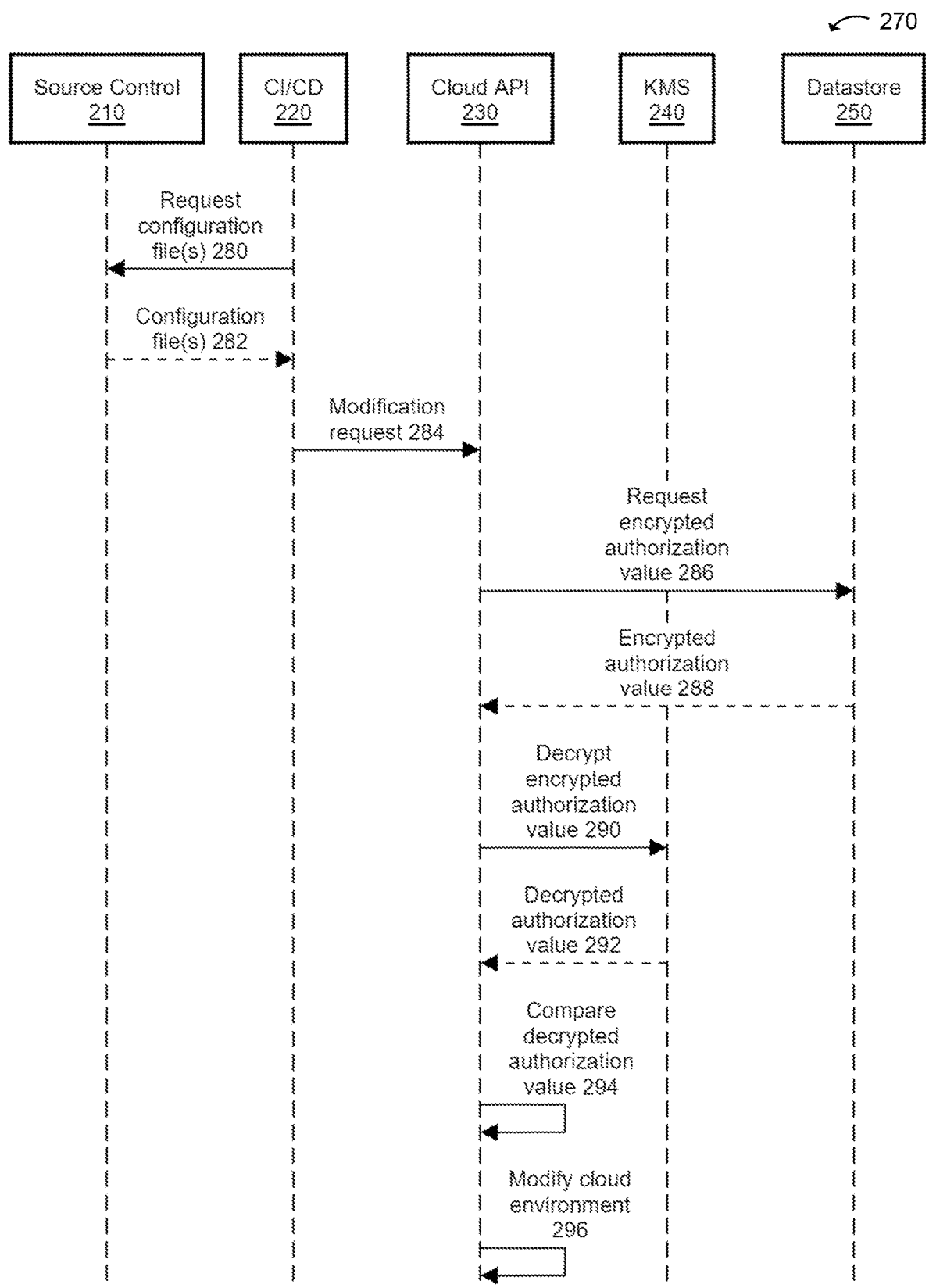

FIGS. 2A-B depict example sequence diagrams 200 and 270 illustrating authorizing cloud environment modifications and modifying cloud environments, in accordance with at least one embodiment. Sequence diagrams 200 and 270 include source control 210, CI/CD 220, cloud API 230, KMS 240, and datastore 250, which, in some embodiments, may be the same as similarly named components of FIG. 1. Although a sequence of events is shown in sequence diagram 200 and sequence diagram 270, it is to be understood that some events may not occur and/or that some events may occur in a different order than the order shown. In some embodiments, additional events may occur before, after, or in between the events shown in sequence diagram 200 and sequence diagram 270.

Referring to sequence diagram 200, at 252, source control 210 may receive one or more IaC configuration files. For example, source control 210 may receive a first IaC configuration file with variable placeholders and a second IaC configuration file with variable values to replace the variable placeholders of the first IaC configuration file. At 254, based on the received IaC configuration file(s), source control 210 may generate an authorization value. In some embodiments, the authorization value includes one or more HTTP requests generated based on the received IaC configuration files. In some embodiments, the one or more HTTP requests are generated by request generator 142 of FIG. 1. In some embodiments, the authorization value includes a hash of the one or more HTTP requests, which were generated based on the received IaC configuration files. In some embodiments, at 256, source control 210 may provide the authorization value to KMS 240 for encryption. At 258, KMS 240 may provide the encrypted authorization value to source control 210. In some embodiments, source control 210 may store the encrypted authorization value.

At 260, source control 210 may generate and send an authorizing request to cloud API 230. The authorizing request may include the encrypted authorization value and credentials of source control 210. At 262, after verifying the credentials provided by source control 210, cloud API 230 may store the encrypted authorization value from the authorizing request to datastore 250. In some embodiments, the sequence described in sequence diagram 200 may occur multiple times before any cloud resources are modified as described below in relation to sequence diagram 270.

Referring now to sequence diagram 270, at 280, CI/CD 220 may request configuration file(s) from source control 210. For example, CI/CD 220 may request the latest (e.g., most recent) version of one or more IaC configuration files. At 282, source control 210 may provide the requested configuration files to CI/CD 220. In some embodiments, instead of providing (or in addition to providing) the requested configuration files, source control 210 may provide an encrypted authorization value corresponding to the configuration files.

At 284, CI/CD 220 may generate a modification request and may provide the request to cloud API 230. In some embodiments, the modification request may include an encrypted authorization value provided by source control 210. In some embodiments, the modification request may include one or more HTTP requests generated based on the configuration files (e.g., IaC configuration files) provided by source control 210. The modification request may also include credentials associated with CI/CD 220.

Cloud API 230 may receive the modification request from CI/CD 220 (at 284). Cloud API 230 may validate the credentials of the modification request. If the credentials are not authorized, cloud API 230 may stop processing the modification request and may not modify computing resources of a cloud environment. At 286, cloud API 230 may request the encrypted authorization value from datastore 250. The encrypted authorization value may have been stored in datastore 250 at 262 of FIG. 2A. At 288, datastore 250 may provide the encrypted authorization value to cloud API 230. In some embodiments, if the modification request includes an encrypted HTTP request, cloud API 230 may compare the encrypted HTTP request of the modification request to the encrypted authorization value. If the encrypted HTTP request matches the encrypted authorization value, cloud API 230 may provide the encrypted HTTP request and/or the encrypted authorization value to KMS 240 for decryption. In some embodiments, cloud API 230 may compare the decrypted HTTP request and the decrypted authorization value to ensure they match. Cloud API 230 may execute the decrypted HTTP request (or the decrypted authorization value) and modify computing resources of a cloud environment based on the HTTP request (or the decrypted authorization value) (which may be based on one or more IaC configuration files).

In some embodiments, if the modification request does not include an encrypted HTTP request, cloud API 230 may calculate a hash of at least a portion of the modification request (e.g., the modification request without the credentials, the body of the modification request, etc.). At 290, cloud API 230 may provide the encrypted authorization value to KMS 240 for decryption. At 292, KMS 240 may provide the decrypted authorization value to cloud API 230. At 294, cloud API 230 may compare the decrypted authorization value to the generated hash of the modification request. In some embodiments, the authorization value was an unencrypted hash, so cloud API 230 may compare the unencrypted hash to the generated hash of the modification request. If the hash matches the decrypted authorization value, at 296, cloud API 230 may execute (at least a portion of) the modification request and modify computing resources of the cloud environment (e.g., computing resource environment 110 of FIG. 1) based on the modification request.

Figure 3:
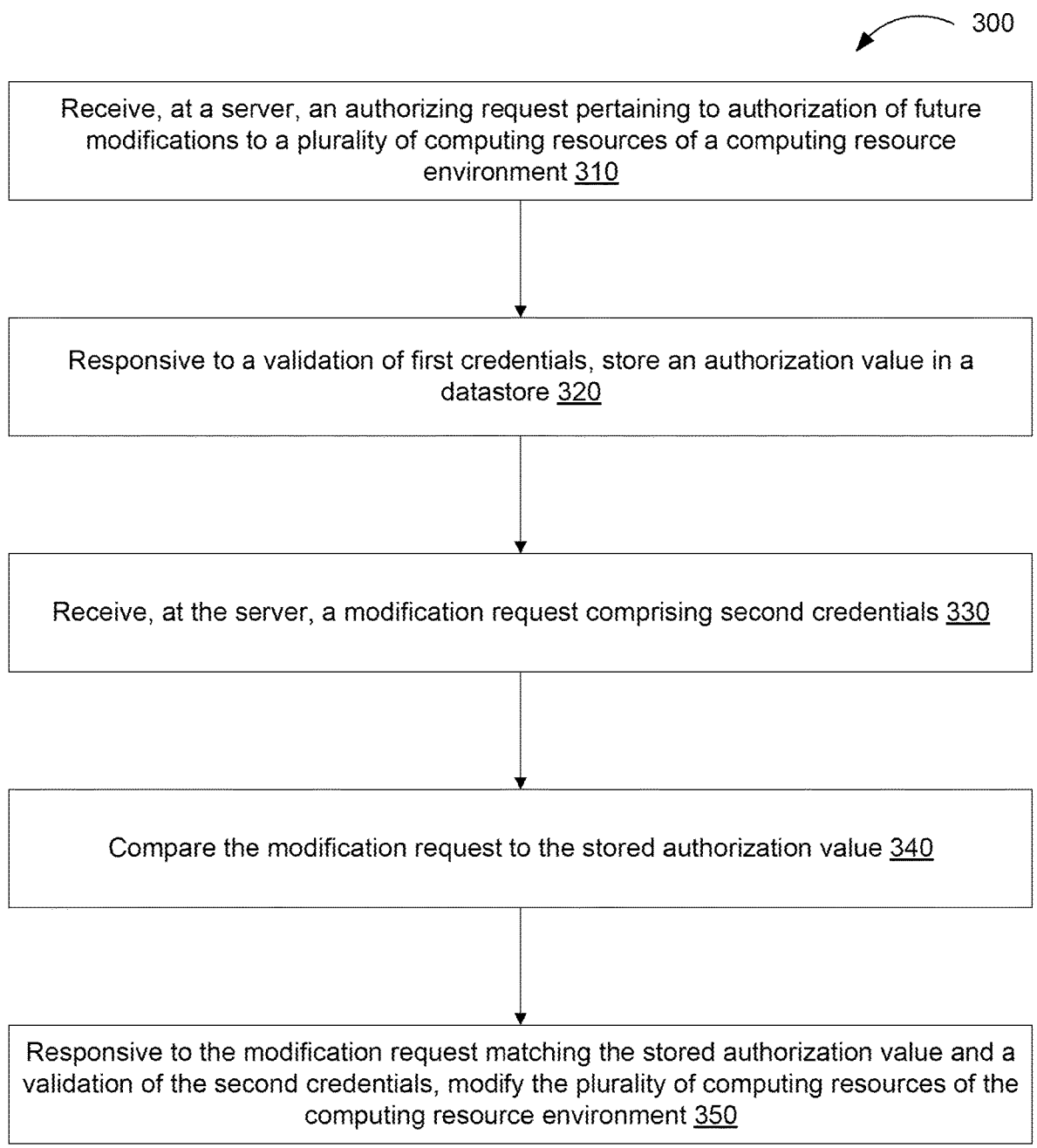
FIG. 3 depicts a flow diagram of an example method of securely modifying a cloud environment, in accordance with at least one embodiment.

FIG. 3 depicts a flow diagram of an example method of securely modifying a cloud environment, in accordance with at least one embodiment. Method 300 can be performed by processing logic that can include hardware (circuitry, dedicated logic, etc.), software (e.g., instructions run on a processing device), or a combination thereof. In at least one implementation, some or all of the operations of method 300 can be performed by one or more components of system 100 for enhanced infrastructure as code security of FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states e.g., via a state diagram. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 310, processing logic receives, at a server, an authorizing request pertaining to authorization of future modifications to a plurality of computing resources of a cloud environment. The authorizing request may include first credentials and an authorization value that is based on a first cloud environment configuration file and a second cloud environment configuration file. The first cloud environment configuration file may be an IaC configuration file and may include one or more variable placeholders. The second cloud environment configuration file may include variable values that replace the placeholders in the first cloud environment configuration file. In at least one embodiment, the server may be computing resource environment 110 and/or environment API 112 of FIG. 1. In some embodiments, the authorizing request may be generated by source control (e.g., source control 140 of FIG. 1) after source control receives changes to the first cloud environment variable and/or the second cloud environment variable.

In some embodiments, the first cloud environment configuration file has been modified subject to validation of third credentials and the second cloud environment configuration file has been modified subject to validation of fourth credentials. The third credentials and the fourth credentials may be different. For example, a user (e.g., IaC developer) may submit code changes to a source control using the third credentials. If the code changes relate to the first cloud environment configuration file, the source control may accept the code changes. If the code changes relate to the second cloud environment configuration file, the source control may reject the code changes. If code changes related to the second cloud environment configuration file are submitted to the source control using the fourth credentials, the code changes may be accepted.

At block 320, processing logic, responsive to a validation of first credentials, stores the authorization value in a datastore. In some embodiments, the authorization value comprises a first encrypted HTTP request based on the first cloud environment configuration file and the second cloud environment configuration file. The first encrypted HTTP request may be generated by a source control (e.g., source control 140 of FIG. 1) and may be encrypted by a key management system (e.g., KMS 160 of FIG. 1). In some embodiments, the authorization value comprises a first encrypted hash based on a hash of an HTTP request based on the first cloud environment configuration file and the second cloud environment configuration file.

At block 330, processing logic receives, at the server, a modification request comprising second credentials. In some embodiments, the modification request includes a second encrypted HTTP request received from the source control. At block 340, processing logic compares the modification request to the stored authorization value. In some embodiments, comparing the modification request to the stored authorization value includes retrieving the stored authorization value from the datastore and comparing the first encrypted HTTP request of the authorization value to the second encrypted HTTP request of the modification request. In some embodiments, comparing the modification request to the stored authorization value includes retrieving the stored authorization value from the datastore, decrypting the first encrypted hash of the stored authorization value to obtain a decrypted hash, calculating a second hash based on at least a portion of the modification request, and comparing the decrypted hash to the second hash.

At block 350, processing logic, responsive to the modification request matching the stored authorization value and a validation of second credentials, modifies the plurality of computing resources of the cloud environment. For example, processing logic may modify computing resource environment 110 and/or computing resources 114 of FIG. 1.

FIG. 4 is a block diagram illustrating an exemplary computer system, in accordance with at least one embodiment of the present disclosure. The computer system 400 can correspond to source control 140, CI/CD 150, KMS 160, computing resource environment 110, environment API 112, and/or computing resources 114, described with respect to FIG. 1. Computer system 400 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 416, which communicate with each other via a bus 430.

Processor (processing device) 402 represents one or more general-purpose processing devices such as a microprocessor, central processing unit, or the like. More particularly, the processor 402 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 can also be one or more special-purpose processing devices such as an application specific integrated circuit (ASIC), a field programmable gate array (FPGA), a digital signal processor (DSP), network processor, or the like. The processor 402 is configured to execute instructions 426 (e.g., for securely modifying a cloud environment) for performing the operations discussed herein.

The computer system 400 can further include a network interface device 408. The computer system 400 also can include a video display unit 410 (e.g., a liquid crystal display (LCD) or a cathode ray tube (CRT)), an input device 412 (e.g., a keyboard, and alphanumeric keyboard, a motion sensing input device, touch screen), a cursor control device 414 (e.g., a mouse), and a signal generation device 418 (e.g., a speaker). In some embodiments, computer system 400 may not include video display unit 410, input device 412, and/or cursor control device 414 (e.g., in a headless configuration).

The data storage device 416 can include a non-transitory machine-readable storage medium 424 (also computer-readable storage medium) on which is stored one or more sets of instructions 426 (e.g., for securely modifying a cloud environment) embodying any one or more of the methodologies or functions described herein. The instructions can also reside, completely or at least partially, within the main memory 404 and/or within the processor 402 during execution thereof by the computer system 400, the main memory 404 and the processor 402 also constituting machine-readable storage media. The instructions can further be transmitted or received over a network 420 via the network interface device 408.

In one implementation, the instructions 426 include instructions for providing automatic rule generation and data-driven detection engineering systems. While the computer-readable storage medium 424 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:
   receiving, at a server, an authorizing request pertaining to authorization of future modifications to a plurality of computing resources of a computing resource environment, the authorizing request comprising first credentials and an authorization value that is based on a first computing resource environment configuration file and a second computing resource environment configuration file;
   responsive to a validation of the first credentials, storing the authorization value in a datastore;
   receiving, at the server, a modification request comprising second credentials;
   comparing the modification request to the stored authorization value; and
   responsive to the modification request matching the stored authorization value and a validation of the second credentials, modifying the plurality of computing resources of the computing resource environment based on the first computing resource environment configuration file and the second computing resource environment configuration file.

2. The method of claim 1, wherein the first computing resource environment configuration file has been modified subject to validation of third credentials, and wherein the second computing resource environment configuration file has been modified subject to validation of fourth credentials, wherein the third credentials and the fourth credentials are different.

3. The method of claim 1, wherein the authorization value comprises a first encrypted hypertext transfer protocol (HTTP) request based on the first computing resource environment configuration file and the second computing resource environment configuration file.

4. The method of claim 3, wherein the first encrypted HTTP request is generated by a source control and encrypted by a key management system (KMS).

5. The method of claim 4, wherein the modification request further comprises a second encrypted HTTP request received from the source control.

6. The method of claim 1, wherein the authorization value comprises a first encrypted hash based on a hash of an HTTP request based on the first computing resource environment configuration file and the second computing resource environment configuration file.

7. The method of claim 6, wherein the comparing the modification request to the stored authorization value comprises:
   retrieving the stored authorization value from the datastore;
   decrypting the first encrypted hash of the stored authorization value to obtain a decrypted hash;

calculating a second hash based on at least a portion of the modification request; and comparing the decrypted hash to the second hash.

8. A system comprising:

a memory device; and a processing device coupled to the memory device, the processing device to perform operations comprising:

receiving, at a server, an authorizing request pertaining to authorization of future modifications to a plurality of computing resources of a computing resource environment, the authorizing request comprising first credentials and an authorization value that is based on a first computing resource environment configuration file and a second computing resource environment configuration file;

responsive to a validation of the first credentials, storing the authorization value in a datastore;

receiving, at the server, a modification request comprising second credentials;

comparing the modification request to the stored authorization value; and responsive to the modification request matching the stored authorization value and a validation of the second credentials, modifying the plurality of computing resources of the computing resource environment based on the first computing resource environment configuration file and the second computing resource environment configuration file.

9. The system of claim 8, wherein the first computing resource environment configuration file has been modified subject to validation of third credentials, and wherein the second computing resource environment configuration file has been modified subject to validation of fourth credentials, wherein the third credentials and the fourth credentials are different.

10. The system of claim 8, wherein the authorization value comprises a first encrypted hypertext transfer protocol (HTTP) request based on the first computing resource environment configuration file and the second computing resource environment configuration file.

11. The system of claim 10, wherein the first encrypted HTTP request is generated by a source control and encrypted by a key management system (KMS).

12. The system of claim 11, wherein the modification request further comprises a second encrypted HTTP request received from the source control.

13. The system of claim 8, wherein the authorization value comprises a first encrypted hash based on a hash of an HTTP request based on the first computing resource environment configuration file and the second computing resource environment configuration file.

14. The system of claim 13, wherein the comparing the modification request to the stored authorization value comprises:

retrieving the stored authorization value from the datastore;

decrypting the first encrypted hash of the stored authorization value to obtain a decrypted hash;

calculating a second hash based on at least a portion of the modification request; and comparing the decrypted hash to the second hash.

15. A non-transitory computer-readable storage medium comprising instructions that, when executed by a processing device, cause the processing device to perform operations comprising:

receiving, at a server, an authorizing request pertaining to authorization of future modifications to a plurality of computing resources of a computing resource environment, the authorizing request comprising first credentials and an authorization value that is based on a first computing resource environment configuration file and a second computing resource environment configuration file;

responsive to a validation of the first credentials, storing the authorization value in a datastore;

receiving, at the server, a modification request comprising second credentials;

comparing the modification request to the stored authorization value; and responsive to the modification request matching the stored authorization value and a validation of the second credentials, modifying the plurality of computing resources of the computing resource environment based on the first computing resource environment configuration file and the second computing resource environment configuration file.

16. The non-transitory computer-readable storage medium of claim 15, wherein the first computing resource environment configuration file has been modified subject to validation of third credentials, and wherein the second computing resource environment configuration file has been modified subject to validation of fourth credentials, wherein the third credentials and the fourth credentials are different.

17. The non-transitory computer-readable storage medium of claim 15, wherein the authorization value comprises a first encrypted hypertext transfer protocol (HTTP) request based on the first computing resource environment configuration file and the second computing resource environment configuration file.

18. The non-transitory computer-readable storage medium of claim 17, wherein the first encrypted HTTP request is generated by a source control and encrypted by a key management system (KMS).

19. The non-transitory computer-readable storage medium of claim 15, wherein the authorization value comprises a first encrypted hash based on a hash of an HTTP request based on the first computing resource environment configuration file and the second computing resource environment configuration file.

20. The non-transitory computer-readable storage medium of claim 19, wherein the comparing the modification request to the stored authorization value comprises:

retrieving the stored authorization value from the datastore;

decrypting the first encrypted hash of the stored authorization value to obtain a decrypted hash;

calculating a second hash based on at least a portion of the modification request; and comparing the decrypted hash to the second hash.

* * * * *